United States Patent
Endo et al.

(10) Patent No.: US 8,605,419 B2
(45) Date of Patent: Dec. 10, 2013

(54) INFORMATION PROCESSING APPARATUS

(75) Inventors: Takeshi Endo, Nagano (JP); Ryosuke Tobiyama, Tokyo (JP); Junichi Tadano, Nagano (JP); Kenji Takagi, Nagano (JP); Kenji Saito, Nagano (JP); Takamitsu Kasai, Nagano (JP)

(73) Assignee: Sony Corporation, Tokyo (JP)

( * ) Notice: Subject to any disclaimer, the term of this patent is extended or adjusted under 35 U.S.C. 154(b) by 155 days.

(21) Appl. No.: 13/354,558

(22) Filed: Jan. 20, 2012

(65) Prior Publication Data
US 2012/0194987 A1 Aug. 2, 2012

(30) Foreign Application Priority Data

Jan. 31, 2011 (JP) .................................. 2011-018638

(51) Int. Cl.
*G06F 1/16* (2006.01)

(52) U.S. Cl.
USPC .............. 361/679.27; 361/679.02; 312/223.1; 312/223.2

(58) Field of Classification Search
USPC .................................................. 361/679.27
See application file for complete search history.

(56) References Cited

U.S. PATENT DOCUMENTS

| 6,680,845 | B2 * | 1/2004 | Agata et al. | 361/679.09 |
| 7,271,997 | B2 * | 9/2007 | Kee et al. | 361/679.27 |
| 2006/0023412 | A1 * | 2/2006 | Schedivy | 361/683 |
| 2006/0227500 | A1 * | 10/2006 | Brandenberg et al. | 361/683 |

FOREIGN PATENT DOCUMENTS

JP 2010-66905 3/2010

* cited by examiner

*Primary Examiner* — Anthony Q Edwards
(74) *Attorney, Agent, or Firm* — Oblon, Spivak, McClelland, Maier & Neustadt, L.L.P.

(57) ABSTRACT

An information processing apparatus includes: an information processing main unit; a display unit electrically connected to the information processing main unit; and a jack having a cylindrical sleeve provided at a housing of the information processing main unit and located coaxially with an insertion hole through which an external terminal is inserted, the jack having a cylindrical hole for accommodating the external terminal, wherein the sleeve of the jack is accommodated inside the housing of the information processing main unit; and an end face of the sleeve facing toward the housing is covered by the housing in the axial direction of the sleeve.

6 Claims, 4 Drawing Sheets

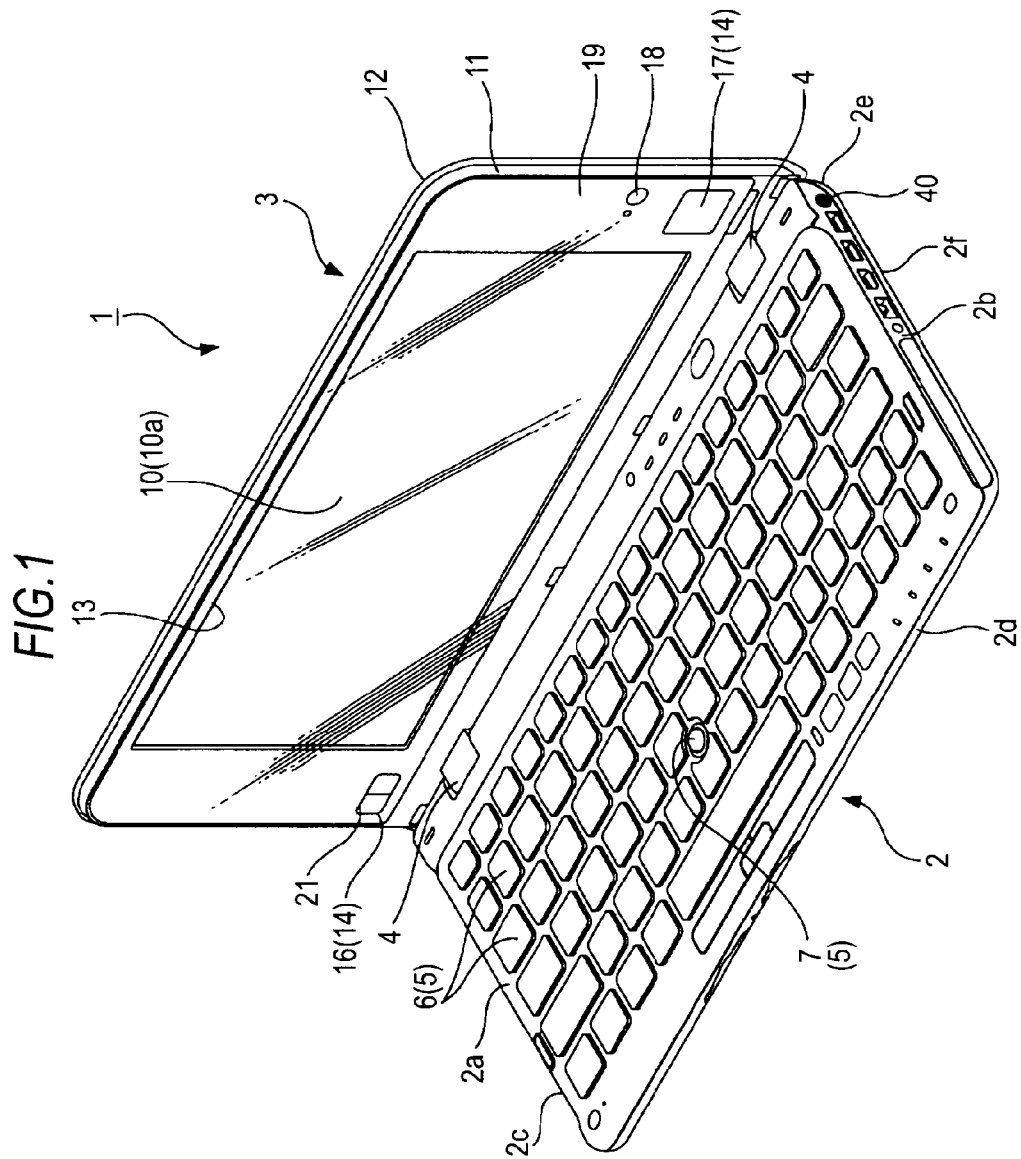

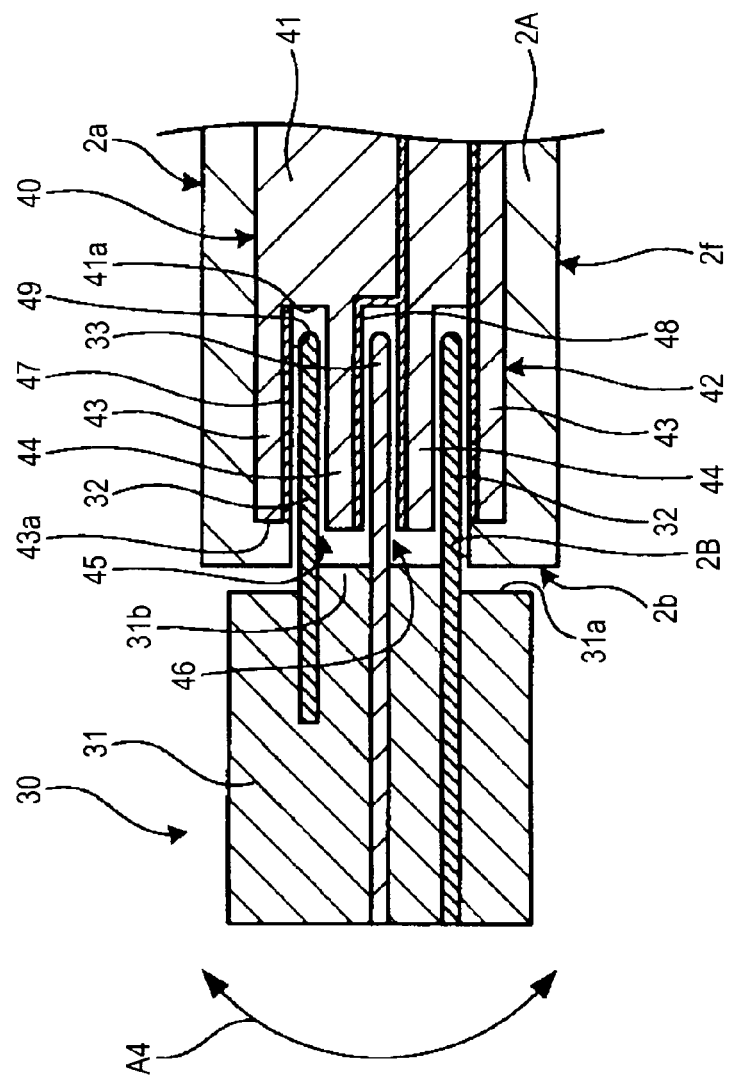
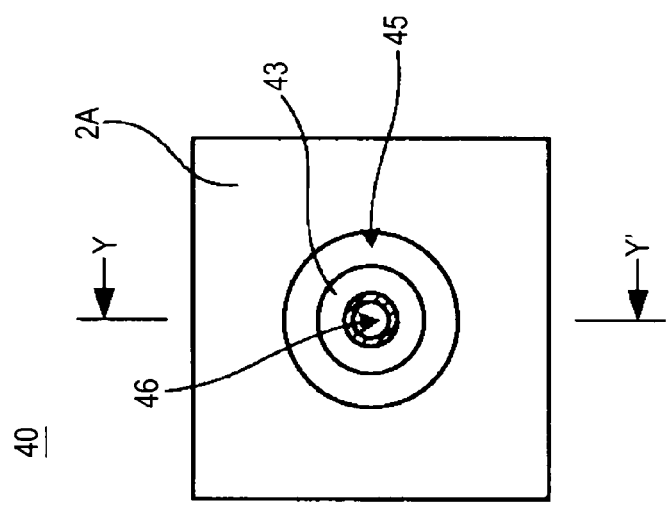

INFORMATION PROCESSING APPARATUS

FIELD

The present disclosure relates to an information processing apparatus having a jack for connecting an external terminal.

BACKGROUND

Efforts toward apparatus having smaller thicknesses have been made in the field of information processing apparatus such as personal computers. For example, JP-A-2010-66905 (Patent Document 1) discloses an approach in which a connector portion for connecting an external terminal is provided at a hinge section of an electronic apparatus where the main body of the apparatus and a display unit of the apparatus are rotatably connected.

Some information processing apparatus such as notebook type personal computers include a connector portion for connecting an external terminal provided at the main body thereof. However, as disclosed in Patent Document 1, when a connector portion of an electronic apparatus for connecting an external terminal to the apparatus is provided at a hinge section, it is possible to reduce the capacity of a space to be left in the apparatus main body to accommodate the connector portion. The thickness of the apparatus as a whole can therefore be kept small accordingly.

SUMMARY

The thickness of an apparatus as a whole can be kept small by providing a connector portion at a hinge section as disclosed in Patent Document 1. However, the disposal of the connector portion is limited to only a position in the hinge section. That is, the design of the product is limited in terms of the position where the connector portion is disposed.

In the meantime, demands for information processing apparatus of versatile designs exist in the modern society in which the majority of people use various types of information processing apparatus.

Under the circumstance, it is desirable to provide an information processing apparatus which can be produced with higher freedom in designing and which can be provided with a small thickness.

An embodiment of the present disclosure is directed to an information processing apparatus including an information processing main unit and a display unit electrically connected to the information processing main unit. The apparatus also includes a jack having a cylindrical sleeve provided at a housing of the information processing main unit and located coaxially with an insertion hole through which an external terminal is inserted, the jack having a cylindrical hole for accommodating the external terminal.

The sleeve of the jack is accommodated inside the housing of the information processing main unit, and an end face of the sleeve facing toward the housing is covered by the housing in the axial direction of the sleeve.

The sleeve of the jack of the information processing apparatus according to the embodiment of the present disclosure is accommodated inside the housing, and the end of the sleeve facing toward the housing is covered by the housing in the axial direction of the sleeve. Since the sleeve is accommodated inside the housing, the thickness of the main body of the information processing apparatus can be kept smaller than a thickness that the apparatus will otherwise have, by an amount equivalent to the thickness of the sleeve.

The information processing main unit of the information processing apparatus according to the embodiment of the present disclosure can be provided with a small thickness even if the jack is provided at the information processing main unit. Thus, an information processing apparatus having a small thickness can be provided with improved freedom in designing in terms of the position where a jack is disposed.

BRIEF DESCRIPTION OF THE DRAWINGS

FIG. 1 is a schematic perspective view of an information processing apparatus according to an embodiment of the present disclosure;

FIG. 2A is a front view of a jack provided on the information processing apparatus according to the embodiment of the present disclosure, and FIG. 2B is a sectional view of the jack showing a state of the jack observed when an external terminal is inserted into the same;

DETAILED DESCRIPTION

Figure 3A:
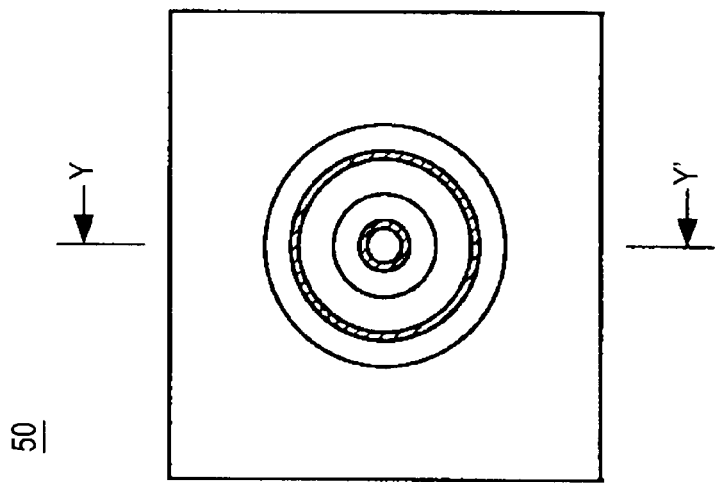
FIG. 3A is a front view of a jack according to the related art.

An embodiment of the present disclosure will now be described, but the present disclosure is not limited to the embodiment described below.

FIG. 1 is a schematic perspective view of an information processing apparatus 1 according to an embodiment of the present disclosure. A notebook type personal computer will be described below as an exemplary information processing apparatus.

The information processing apparatus 1 according to the embodiment of the present disclosure includes an information processing main unit 2, a display unit 3, and hinge mechanisms 4. The information processing main unit 2 and the display unit 3 are formed such that they can be lapped on each other. The information processing main unit 2 and the display unit 3 are rotatably connected with each other by the hinge mechanisms 4, and the display unit 3 can be lapped on the information processing main unit 2.

The information processing main unit 2 is formed in a flat and substantially cuboid shape. A control portion and a storage device such as an HDD (hard disk drive) or a flash SDD (solid-state drive) are incorporated in the information processing main unit 2. The control portion is formed by mounting predetermined microcomputers, resistors, capacitors, and other electronic components on a printed circuit board.

The information processing main unit 2 has a substantially rectangular main surface 2a, two side surfaces 2b and 2c opposite to each other, a front surface 2d, a rear surface 2e opposite to the front surface 2d, and a mounting surface 2f opposite to the main surface 2a. The two side surfaces 2b and 2c are formed contiguously with the main surface 2a so as to meet two respective longitudinal ends of the main surface 2a substantially perpendicularly thereto. The front surface 2d is disposed at one transversal end of the main surface 2a. The rear surface 2e is opposite to the front surface 2d and is disposed at the other transversal end of the main surface 2a. The mounting surface 2f is opposite to the main surface 2a.

First input portions 5 are provided on the main surface 2a. The first input portions 5 include a first key input portion 6 constituted by a multiplicity of keys and a stick pointer 7. The stick pointer 7 is disposed in the middle of the main surface 2a. The stick pointer 7 is used for moving a cursor displayed on a display surface of the display unit 3 and scrolling a screen, as will be described later.

Control signals are input from the first key input portion 6 and the stick pointer 7 to enable predetermined information processing.

The hinge mechanisms 4 are provided at the rear surface 2e, the mechanism being located on both sides of the main body when viewed in the longitudinal direction thereof. The information processing main unit 2 and the display unit 3 are rotatably connected by the hinge mechanisms 4. Thus, the information processing apparatus 1 is formed such that the display unit 3 is rotatable with respect to the information processing main unit 2. The hinge mechanisms 4 are configured such that the display unit 3 can be kept tilted with respect to the information processing main unit 2 in an arbitrary angular position.

The display unit 3 has a flat and substantially cuboid shape similar to the shape of the information processing main unit 2. The display unit 3 has a display panel 10, a front plate 11 which is opposite to the main surface 2a of the information processing main unit 2, and a rear plate 12. A camera may be incorporated in the display unit 3.

For example, the display panel 10 may be a liquid crystal display, an organic EL display, or a surface-conduction electron-emitter display. Although not shown, a printed circuit board carrying a controller for controlling the screen of the display panel 10 is contained inside the display panel 10 as occasion demands. The display panel 10 is configured to be able to display various types of information and images.

The front plate 11 is in the form of a substantially rectangular sheet. The front plate 11 has a substantially rectangular opening 13. The display panel 10 is secured to the front plate 11 through a frame member which is not shown. A display surface 10a of the display panel 10 mounted inside the front plate 11 is exposed at the opening 13.

Second input portions 14 are provided on both sides of the opening 13 of the front plate 11 when viewed in the longitudinal direction of the plate. The second input portions 14 are located on both sides of the opening 13 when viewed in the longitudinal direction of the opening and located near the region of the display unit connected to the information processing main unit 2. The second input portions 14 include a second key input portion 16 constituted by two keys and a touch input portion 17 in the form of a touch panel. For example, an input method utilizing an electrostatic capacity or a resistive film may be used for the touch input portion 17. An imaging window 18 at which a lens portion of a camera is exposed is provided in the vicinity of the touch input portion 17.

Further, a clear panel 19 is attached to the front plate 11 to cover the opening 13, the touch input portion 17, and the imaging window 18. The clear panel 19 is a member in the form of a transparent sheet. The clear panel 19 is formed with an exposing window 21. The exposing window 21 is disposed in such a position on the panel that the window accommodates the second key input portion 16 when the clear panel 19 is attached to the front plate 11. Thus, the second key input portion 16 provided on the front plate 11 is exposed at the exposing window 21.

The rear plate 12 is in the form of a substantially rectangular sheet. The rear plate 12 is disposed on the side of the display panel 10 opposite to the display surface 10a to cover the entire rear surfaces of the front plate 11 and the display panel 10.

The information processing apparatus 1 as thus described has connection terminals provided on the side surface 2b of the information processing main unit 2 for connecting the apparatus with external devices such as an external power source, an external disk drive, and a USB flash memory.

For example, in the present embodiment, a jack 40 which is a DC jack for connecting an external power supply is disposed in a position on the side surface 2b near the rear surface 2e.

FIG. 2A is a schematic front view of the jack 40 taken in a direction perpendicular to the side surface 2b. FIG. 2B is a schematic sectional view of the jack 40 taken along the line Y-Y' in FIG. 3A showing a state of the jack observed when a plug 30 of an external power supply is inserted.

For example, the plug 30 has a housing 31 which is made of an insulator and a peripheral electrode 32 and a central electrode 33 which constitute an external terminal to be connected to the jack 40 and which are secured to the insulator housing 31.

The plug 30 has a columnar protrusion 31b protruding from the center of an end face 31a of the insulator housing 31 which faces the jack 40 when the plug is connected. The peripheral electrode 32 which has a cylindrical shape protrudes from the end face 31a of the insulator housing 31, the electrode protruding along the periphery of the protrusion 31b.

The central electrode 33 protrudes from the position of the protrusion 31b corresponding to the central axis of the peripheral electrode 32 to extend in the axial direction of the peripheral electrode 32.

In the case of the plug 30 for DC power supply which is in compliance with the EIAJ (Electronic Industries Association of Japan) standard, the central electrode 33 and the peripheral electrode 32 serve as a positive pole and a negative pole, respectively.

The jack 40 has an insulator housing 41 and a accommodating portion 42 accommodating the peripheral electrode 32 and the central electrode 33 of the plug 30.

The accommodating portion 42 includes a sleeve 43 protruding from the insulator housing 41 and a cylindrical body 44.

The sleeve 43 protrudes from an end face 41a of the insulator housing 41 facing the plug 30 and has a cylindrical shape. A cylindrical hole 49 defined by the sleeve 43 constitutes a receiving hole in which the external terminal is accommodated. A cylindrical body 44 protrudes from the end face 41a of the insulator housing 41 into the cylindrical hole of the sleeve 43.

The sleeve 43 and the cylindrical body 44 are coaxial, and the diameter of an outer circumference of the cylindrical body 44 is smaller than the diameter of an inner circumference of the sleeve 43.

The cylindrical hole 49 in the sleeve 43 is divided into two spaces, i.e., a first accommodating hole 45 and a second accommodating hole 46, by the cylindrical body 44.

The first accommodating hole 45 which has a cylindrical shape is formed between an inner circumferential surface of the sleeve 43 and an outer circumferential surface of the cylindrical body 44, and the peripheral electrode 32 of the plug 30 is accommodated in the first accommodating hole 45.

The second accommodating hole 46 which is a cylindrical hole defined by the cylindrical body 44 accommodates the central electrode 33 of the plug 30.

A first electrode 47 is disposed on the inner circumferential surface of the sleeve 43, and the electrode is electrically connected to the peripheral electrode 32 of the plug 30. A second electrode 48 is disposed on an inner circumferential surface of the cylindrical body 44, and the electrode is electrically connected to the central electrode 33 of the plug 30.

Any method may be used without particular limitation to establish electrical connection between the first electrode 47 and the peripheral electrode 32 and between the second electrode 48 and the central electrode 33 and to lock the peripheral electrode 32 and the central electrode 33 in the accommodating portion 42. Various approaches may be adopted such as establishing conduction between the first electrode 47 and the peripheral electrode 32 through a sleeve spring.

The jack 40 is accommodated in a housing 2A of the information processing main unit 2 (not shown). The housing 2A is made of, for example, engineering plastic. The housing 2A has an opening on a side surface thereof (the side surface 2b of the information processing main unit 2 shown in FIG. 1), and the opening constitutes an insertion hole 2B through which the peripheral electrode 32 and the central electrode 33 are inserted. The axis of the insertion hole 2B coincides with the axis of the sleeve 43 and the cylindrical body 44.

As shown in FIG. 2A, the first accommodating hole 45 and the second accommodating hole 46 of the accommodating portion 42 are exposed at the insertion hole 2B.

The sleeve 43 of the jack 40 in the present embodiment is accommodated in the housing 2A. In particular, an axial end face 43a of the sleeve 43 is covered by the housing 2A. Such a configuration allows the information processing main unit 2 to be provided with a small thickness even if the jack 40 is disposed in the information processing main unit 2.

Figure 3B:
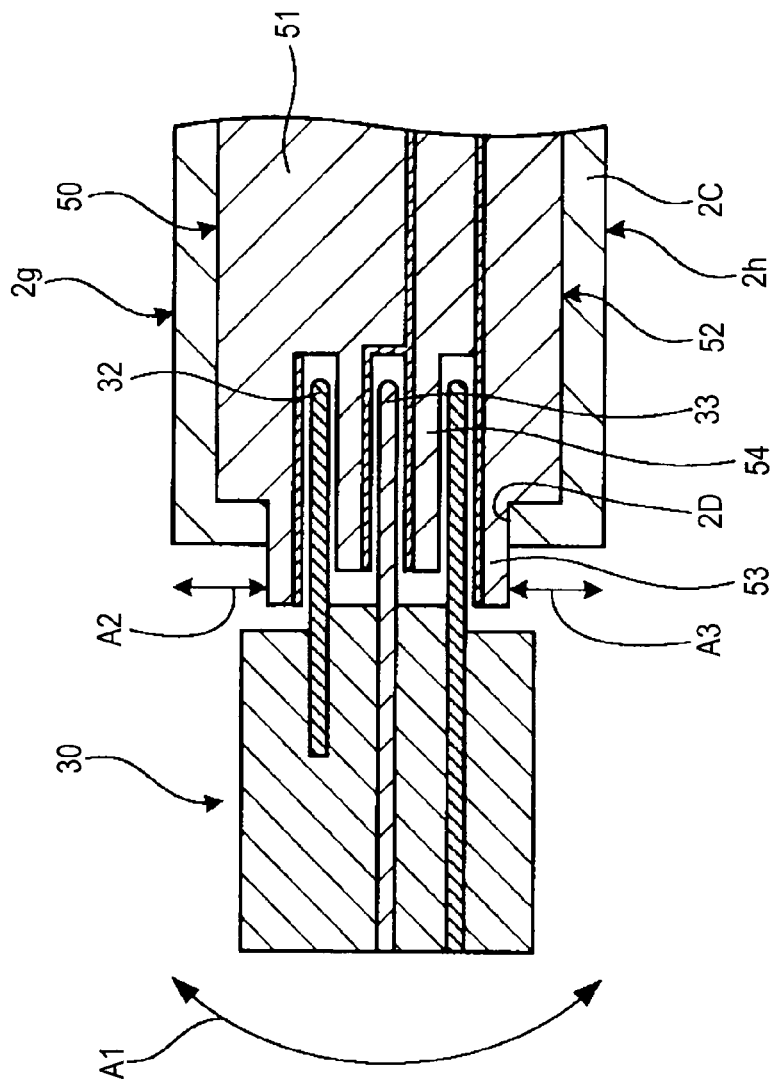
FIG. 3B is a sectional view of the jack according to the related art showing a state of the jack observed when an external terminal is inserted into the same.

A jack 50 according to the related art is shown in FIGS. 3A and 3B as a comparative example. FIG. 3A is a front view of the jack 50 according to the related art, and FIG. 3B is a sectional view of the jack 50 taken along the line Y-Y' in FIG. 3A showing a state of the jack observed when the plug 30 is inserted.

For example, the jack 50 according to the related art includes an insulator housing 51 and a accommodating portion 52 for accommodating the peripheral electrode 32 and the central electrode 33 of the plug 30. The accommodating portion 52 is formed by a sleeve 53 and a cylindrical body 54 protruding from the insulator housing 51, and the sleeve 53 protrudes beyond a peripheral surface of a housing 2C of an information processing apparatus main body.

For example, when the plug 30 is moved by vibration or the like in the directions indicated by the arrow A1, the peripheral electrode 32 is supported in place by abutting on the part of the sleeve 53 protruding beyond the housing 2C, and the width of shaking of the peripheral electrode 32 and the central electrode 33 can therefore be kept small. Thus, the breakage of the peripheral electrode 32 and the central electrode 33 is prevented.

Generally speaking, the distances from a main surface 2g and a mounting surface 2h of the housing 2C of the information processing main unit to an opening 2D of the housing 2C indicated by arrows A2 and A3 must be kept at a certain value or more. The reason is that it is difficult to mold the housing 2C having such an opening properly without keeping the above-mentioned distances at a certain value or more.

According to the related art, it is difficult to provide the information processing main unit with a small thickness because the thickness of the sleeve 53 protruding beyond a peripheral surface of the housing 2C and predetermined distances to be kept between the main surface 2g and the mounting surface 2h of the housing 2C and the opening 2D are inevitably reflected in the thickness of the information processing main unit.

On the contrary, the sleeve 43 of the information processing apparatus 1 of the present embodiment is accommodated inside the housing 2A as shown in FIG. 2B, and the sleeve 43 is covered by the housing 2A when viewed in the axial direction of the sleeve 43.

Thus, the size of the insertion hole 2B can be kept smaller by an amount equivalent to the thickness of the sleeve 43. Since the end face 43a of the sleeve 43 is covered by the housing 2A, the distances from the insertion hole 2B to the main surface 2a and the mounting surface 2f of the housing 2A (information processing main unit 2) can be easily kept satisfactory in light of the distance to be kept for proper molding of the housing 2A.

The distance from the insertion hole 2B to the main surface 2a of the housing 2A (information processing main unit 2) and the distance from the insertion hole 2B to the mounting surface 2f may be equal to the distances indicated by the arrows A2 and A3 in FIG. 3B. The information processing main unit 2 can be provided with a small thickness reflecting the reduction achieved in the size of the insertion hole 2B that is equivalent to the thickness of the sleeve 43.

As thus described, the information processing main unit 2 of the information processing apparatus 1 according to the present embodiment can be provided with a small thickness even if the jack 40 is provided in the main unit. Therefore, improved freedom in designing is achieved in terms of the position in which a jack is disposed, and an information processing apparatus having a small thickness can be produced with higher freedom in designing.

Preferably, the diameter of the insertion hole 2B is equal to or smaller than the diameter of the inner circumference of the sleeve 43.

Thus, when the plug 30 is moved in the directions indicated by the arrow A4, the peripheral electrode 32 abuts on the housing 2A at the periphery of the insertion hole 2B, whereby the peripheral electrode 32 and the plug 30 are supported.

For example, in the structure of FIG. 3B in which the peripheral electrode 32 abuts on the end of the sleeve 53 of the jack 50, the entire force applied to the plug is temporarily received by the sleeve 53 (jack 50), and the jack 50 may therefore be broken.

In the case of the jack 40 of the present embodiment, when the plug 30 is moved, the peripheral electrode 32 is made to abut on the housing 2A to support the peripheral electrode 32. It is therefore possible to prevent the force applied to the plug 30 from being directly transmitted to the jack 40. Thus, damage to the jack 40 can be more reliably prevented.

The present embodiment may be regarded as a mode of implementation in which the function of guiding and supporting an external terminal is provided not only by the sleeve but also by the housing of the information processing apparatus.

Since the housing 2A at the periphery of the insertion hole 2B is used as a sleeve, the cylindrical body 44 is located inwardly from the side surface of the housing 2A (side surface 2b). Therefore, the accommodating portion 42 as a whole is located inwardly from the peripheral surface of the housing 2A.

The housing of an information processing apparatus is formed with high rigidity in general, and the plug 30 can therefore be easily supported without forming the housing 2A using a special treatment.

Figure 4:
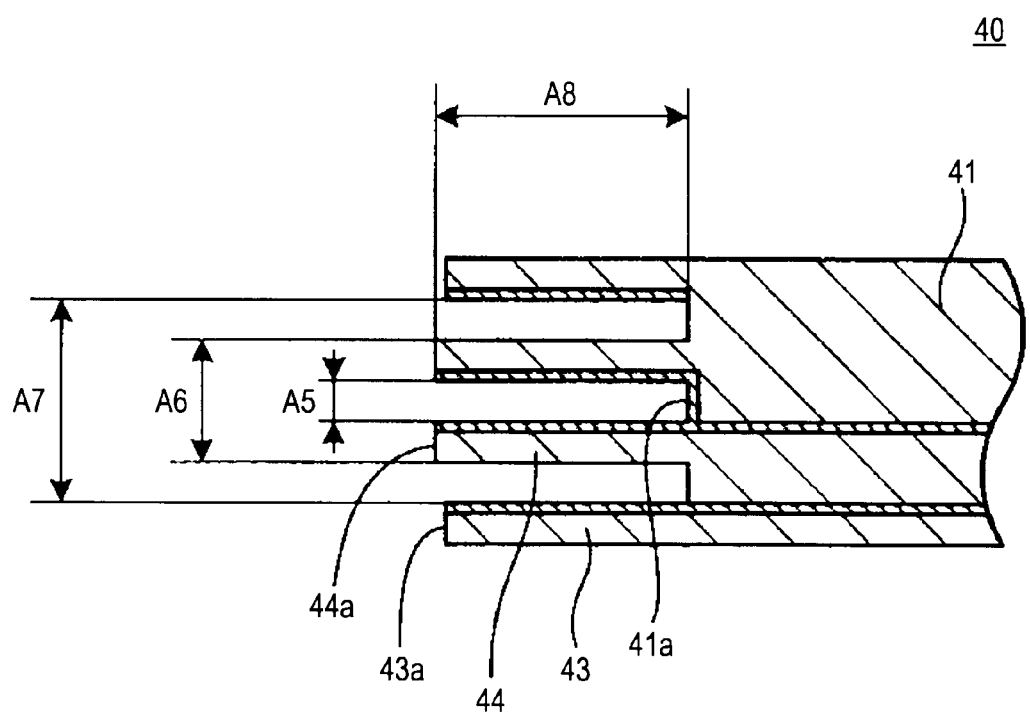
FIG. 4 is an illustration of the jack according to the embodiment of the present disclosure showing parts thereof which are subject to dimensional regulations.

For example, jack specifications are defined in Class 5 of EIAJ standard. FIG. 4 is an illustration of the jack having dimensions in compliance with the standard.

Four dimensions of the jack are determined according to the standard. The first dimension is the diameter of an inner circumference of the cylindrical body 44 which is indicated by an arrow A5. The second dimension is the diameter of the outer circumference of the cylindrical body 44 which is indicated by an arrow A6. The third dimension is the diameter of the inner circumference of the sleeve 43 which is indicated by an arrow A7. The fourth dimension is the distance from the end face 41*a* of the insulator housing 41 to the end face 44*a* of the cylindrical body 44 or the length of the cylindrical body 44 which is indicated by an arrow A8.

As thus described, there are regulations on only parts of jacks used for engaging the jacks with external terminals, and there is no limitation on the outline of jacks. The jack 40 of the embodiment of the present disclosure is therefore subject to no particular limitation on the outline thereof, and the outline may be changed as occasion demands. For example, the thickness of the sleeve 43 is not required to be kept uniform in the circumferential direction of the sleeve, and the thickness may vary in that direction.

An embodiment of an information processing apparatus according to the present disclosure has been described above. The present disclosure is not limited to the above-described embodiment, and the technique may be carried out in various other modes of implementation without departing from the spirit of the present disclosure.

The present disclosure contains subject matter related to that disclosed in Japanese Priority Patent Application JP 2011-018638 filed in the Japan Patent Office on Jan. 31, 2011, the entire content of which is hereby incorporated by reference.

What is claimed is:

1. An information processing apparatus comprising:
an information processing main unit;
a display unit electrically connected to the information processing main unit; and
a jack having a cylindrical sleeve provided at a housing of the information processing main unit and located coaxially with an insertion hole through which an external terminal is inserted, the jack having a cylindrical hole for accommodating the external terminal, wherein
the sleeve of the jack is accommodated inside the housing of the information processing main unit; and
an end face of the sleeve facing toward the housing is covered by the housing in the axial direction of the sleeve.

2. An information processing apparatus according to claim 1, wherein the diameter of the insertion hole provided on the housing and through which the external terminal is inserted is equal to or smaller than the diameter of the inner circumference of the sleeve.

3. An information processing apparatus according to claim 1, wherein the jack includes a cylindrical body disposed in the accommodating hole of the sleeve coaxially with the jack, the diameter of an outer circumference of the cylindrical body being smaller than the diameter of the inner circumference of the sleeve.

4. An information processing apparatus according to claim 3, wherein an end face of the cylindrical body facing toward the housing is located inside an outer circumferential surface of the housing.

5. An information processing apparatus according to claim 4, wherein
a first accommodating hole for accommodating a negative electrode of the external terminal is formed between an inner circumferential surface of the sleeve and the outer circumferential surface of the housing; and
the cylindrical hole in the cylindrical body serves as a second accommodating hole for accommodating a positive electrode of the external terminal.

6. An information processing apparatus according to claim 5, wherein the jack is a DC jack.

* * * * *